Jan. 14, 1930.  A. G. WAGNER  1,743,943
GEAR SUBSTITUTE
Filed Nov. 22, 1923
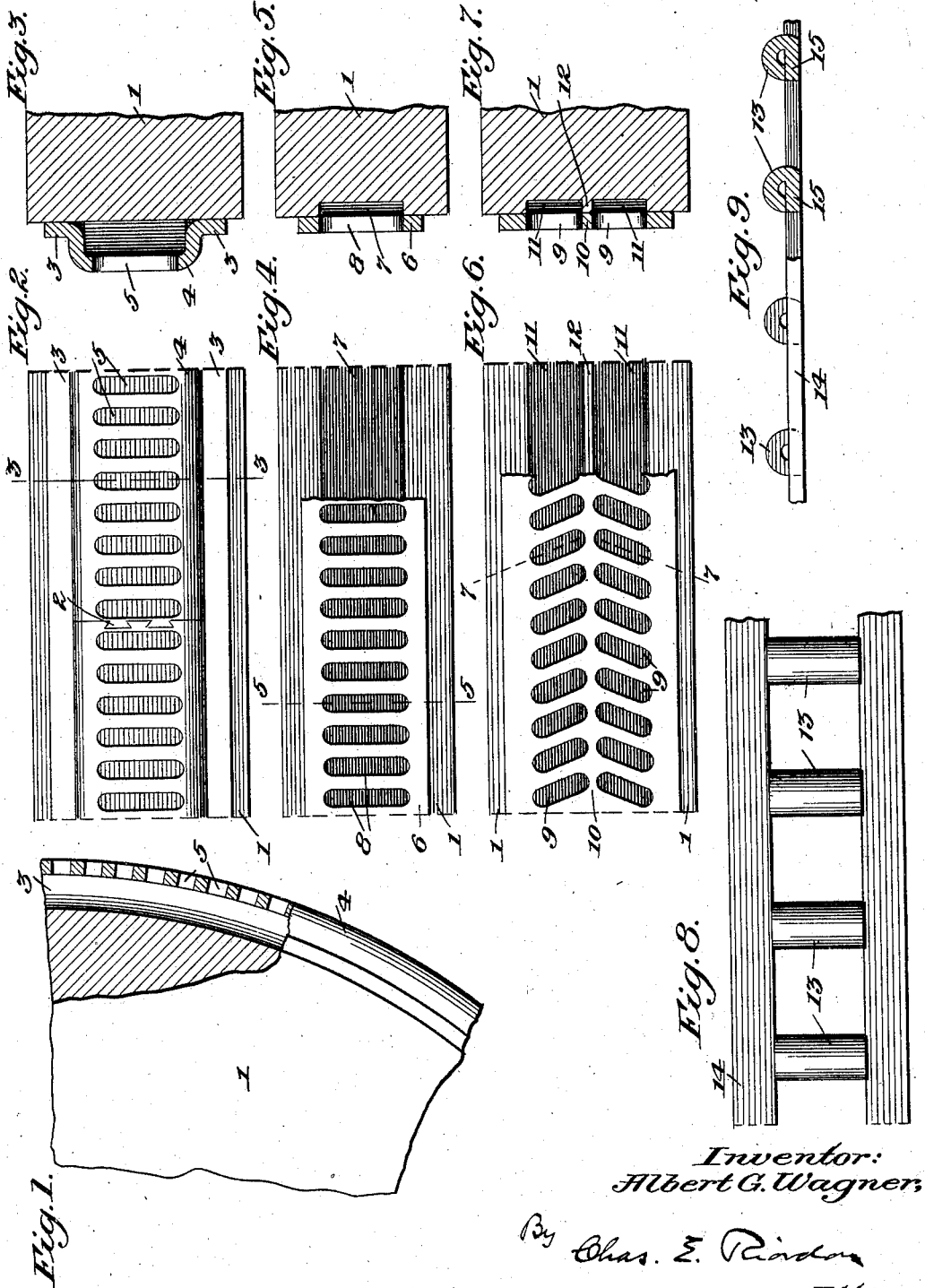
Inventor:
Albert G. Wagner,
By Chas. E. Riordan
Att'y.

Patented Jan. 14, 1930

1,743,943

UNITED STATES PATENT OFFICE

ALBERT G. WAGNER, OF NORWOOD, OHIO, ASSIGNOR TO THE WEMB COMPANY, OF CINCINNATI, OHIO, A CORPORATION OF OHIO

GEAR SUBSTITUTE

Application filed November 22, 1923. Serial No. 676,306.

My present invention relates to gearing and its object is to provide an efficient gear element which will be strong and durable, will lend itself readily to any design of tooth or working surface, and may be produced at a cost greatly below the cost of gears of the usual construction. The invention is illustrated in the accompanying drawing and will be hereinafter fully described, the novel features being particularly pointed out in the appended claim.

In the drawing, Fig. 1 is a sectional elevation of a fragment of a gear wheel having one form of the invention applied thereto.

Fig. 2 is a plan view of the form of the invention shown in Fig. 1.

Fig. 3 is a section on the line 3—3 of Fig. 2.

Fig. 4 is a plan view of another form of the invention.

Fig. 5 is a section on the line 5—5 of Fig. 4.

Fig. 6 is a plan view of a third form of the invention.

Fig. 7 is a section on the line 7—7 of Fig. 6.

Fig. 8 is a plan view of a fourth form of the invention, and

Fig. 9 is an edge view, partly in longitudinal section of the form shown in Fig. 8.

The reference numeral 1 indicates a portion of the body of a gear wheel. It has heretofore been the general practice to cut gear teeth directly upon the periphery of the wheel or to machine a metal ring with gear teeth thereon and then press or otherwise fasten the ring on the wheel. The teeth would frequently break from the wheel, rendering the entire wheel useless, and the use of the gear ring was costly as it involved several machine operations in addition to the tooth-cutting work.

In carrying out my invention, I employ a sheet metal band, the ends of which may be welded together or connected in an interlocking dove-tailed joint, as at 2. In the form shown in Figs. 1, 2 and 3, the side edge portions 3 of the band 4 are pressed into offset relation to the medial longitudinal portion of the band so that when the band is pressed onto the periphery of the wheel the said medial portion will be spaced from the peripheral surface of the wheel, as shown clearly in Fig. 3, thereby providing ample clearance between the wheel and the central portion of the band for the teeth of a co-operating intermeshing driving element. Transverse slots or openings 5 are formed through the band at equal intervals from end to end thereof and the spurs or teeth of the driving element engage in these openings to drive the gear in an obvious manner.

In the form shown in Figs. 4 and 5, the band 6 is flat in cross section and a groove 7 is formed in the periphery of the wheel 1 circumferentially thereof to provide clearance for the teeth of the cooperating driving element. The transverse openings 8 are the same as the openings 5 in the first-described form.

The form shown in Figs. 6 and 7, has two longitudinal rows of openings 9 and a central web 10 which lends some additional strength to the band, the openings being disposed obliquely with the openings in one row at an angle to the openings in the other row. The band, in this form of the invention, may be offset from the wheel as the band shown in Figs. 2 and 3 is offset, but I prefer to form two circumferential groves 11 in the wheel separated by a rib 12 which supports and reenforces the web 10 of the band.

In Figs. 8 and 9, I have shown a gear band or ring in which the tooth-engaging elements or surfaces are of a somewhat different formation. In this form of the invention, tongues 13 are struck up from the body of the band 14 at regular intervals leaving cross bars 15, and are then rolled over upon the cross bars as shown clearly in Fig. 9. The rolled over tongues present convex faces to engage between adjacent teeth of a driving element, the spaces between the convex faces receiving the driving element teeth.

While I have referred to the basal element of the gear as a band, it is to be understood that I do not restrict myself to a band formed from a flat strip as it may be a ring cut from a tube. While the band may be mounted on the wheel in any desired manner, I prefer to press it on the wheel with sufficient friction to withstand the driving strains.

Having thus fully described my invention, what I claim as new and desire to secure by Letters Patent of the United States is:—

A gear consisting of a wheel body having circumferential grooves separated by a circumferential rib, and a band encircling said body and having longitudinal rows of equidistant openings lying over said grooves and an intervening web resting on said rib.

In testimony whereof I hereunto affix my signature.

ALBERT G. WAGNER.